US011762553B2

(12) United States Patent
Basu et al.

(10) Patent No.: US 11,762,553 B2
(45) Date of Patent: Sep. 19, 2023

(54) RUNTIME SELECTION OF MEMORY DEVICES AND STORAGE DEVICES IN A DISAGGREGATED MEMORY SYSTEM

(71) Applicant: Micron Technology, Inc., Boise, ID (US)

(72) Inventors: Reshmi Basu, Boise, ID (US); Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/874,033

(22) Filed: Jul. 26, 2022

(65) Prior Publication Data
US 2022/0357851 A1    Nov. 10, 2022

Related U.S. Application Data

(63) Continuation of application No. 17/143,558, filed on Jan. 7, 2021, now Pat. No. 11,416,143.

(51) Int. Cl.
*G06F 3/00* (2006.01)
*G06F 3/06* (2006.01)

(52) U.S. Cl.
CPC .......... *G06F 3/0604* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | | | |
|---|---|---|---|---|---|
| 5,590,073 | A | ‡ | 12/1996 | Arakawa | G11C 7/1051 365/228 |
| 5,726,930 | A | ‡ | 3/1998 | Hasegawa | G11C 11/22 365/145 |
| 7,289,386 | B2 | ‡ | 10/2007 | Bhakta | G06F 12/0207 711/E12.003 |
| 9,760,527 | B2 | ‡ | 9/2017 | Egi | G06F 13/4282 |
| 2003/0177303 | A1 | ‡ | 9/2003 | Langendorf | G11C 7/1024 711/105 |
| 2011/0225347 | A1 | ‡ | 9/2011 | Goss | G06F 12/0246 711/103 |
| 2022/0357889 | A1 | * | 11/2022 | Malik | G06F 3/0604 |

* cited by examiner
‡ imported from a related application

*Primary Examiner* — Midys Rojas
(74) *Attorney, Agent, or Firm* — Brooks, Cameron & Huebsch, PLLC

(57) ABSTRACT

Methods, systems, and apparatuses related to runtime selection of memory devices and storage devices in a disaggregated memory system are described. For example, a controller can be coupled to a plurality of memory device and a plurality of storage devices. The controller can receive signaling indicative of a memory request corresponding to execution of an application. Responsive to receiving the signaling indicative of the memory request, the controller can select a memory device or a storage device, or both, selecting from the plurality of memory devices or the plurality of storage devices, or both, to perform a memory operation associated with the memory request. Responsive to receiving the memory request and selecting the memory device or the storage device, or both, the controller can perform the memory operation using the selected memory device or the selected storage device, or both.

19 Claims, 6 Drawing Sheets

US 11,762,553 B2

RUNTIME SELECTION OF MEMORY DEVICES AND STORAGE DEVICES IN A DISAGGREGATED MEMORY SYSTEM

PRIORITY INFORMATION

This application is a Continuation of U.S. application Ser. No. 17/143,558, filed Jan. 7, 2021, the contents of which are herein incorporated by reference.

TECHNICAL FIELD

The present disclosure relates generally to semiconductor memory and methods, and more particularly, to apparatuses, systems, and methods for runtime selection of memory devices and storage devices in a disaggregated memory system.

BACKGROUND

Memory devices are typically provided as internal, semiconductor, integrated circuits in computers or other electronic systems. There are many different types of memory devices including volatile memory devices and non-volatile storage devices. Volatile memory devices can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile storage devices can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
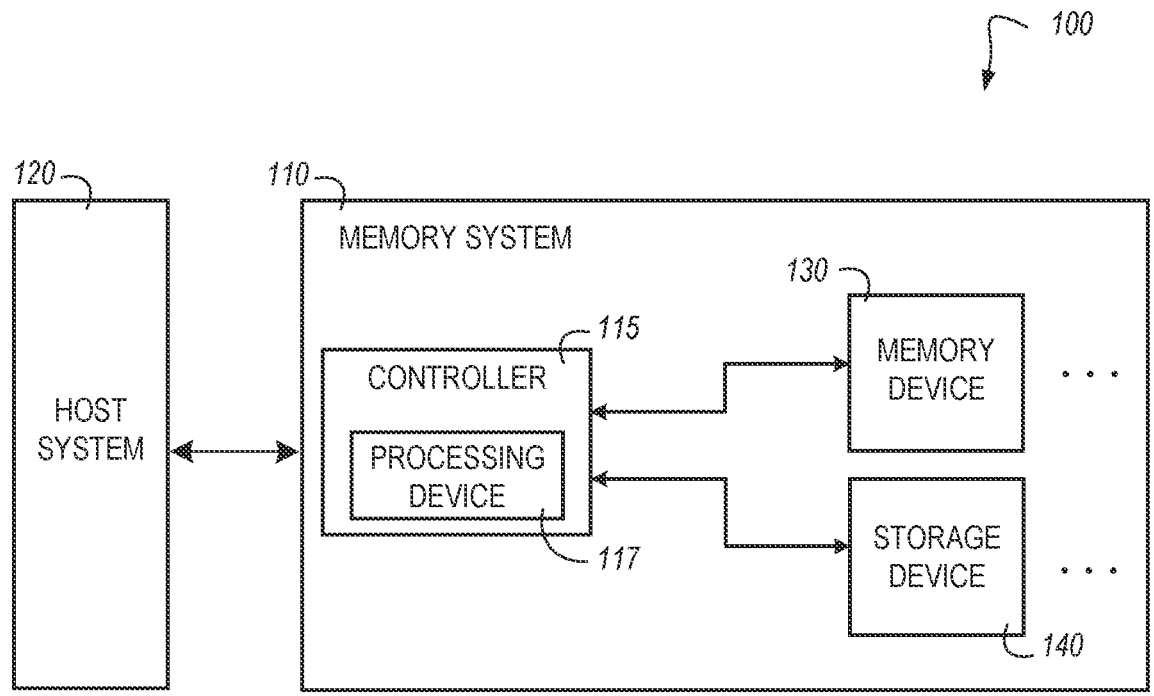
FIG. 1 illustrates an example computing system that includes a memory system in accordance with a number of embodiments of the present disclosure.

Methods, systems, and apparatuses relate to runtime selection of memory devices and storage devices in a disaggregated memory system. As used herein a "disaggregated memory system" refers to a memory system that employs two or more different types of memory in two or more respective locations in the memory system. For instance, a first type of memory can be located in a first slot or interface of a memory system and a second type of memory which is different from the first type of memory can be located in a second slot or interface of the memory system. As such, different types of memory technology can be utilized within the same "disaggregated memory system." Different types of memory technology have distinct properties, such as capacity, hardware cost, and latency.

Some conventional approaches can provide a memory system having a predefined amount/type of memory technology as configured at time of manufacture of the memory system. However, such approaches can be limited at least in terms of physical configuration/interface type, power/cooling provisioning, and/or data transfer protocol to the predefined amounts/type of memory technology from the time of manufacture. Such memory systems therefore are not readily alterable by an end user or otherwise. Moreover, such memory systems can provide only one particularly type of memory technology (e.g, volatile memory or non-volatile storage). Therefore, due at least to providing only one particularly type of memory technology, such approaches do not provide a disaggregated memory system and/or do not permit runtime selection between the different types of memory/storage technologies.

Some conventional approaches can utilize dedicated combinations of different types of memory technology at a given location in a memory system such as at a particular slot or interface in a memory system. For instance, a non-volatile dual inline memory module (NVDIMM) may be coupled to a particular slot in a memory system. The NVDIMM may employ a dedicated combination of a fixed amount of non-volatile storage in conjunction with a fixed amount of volatile memory to store data. For example, a NVDIMM may copy data from the volatile memory in the NVDIMM to the non-volatile storage in the NVDIMM in response to a power off-event in the memory system. Thus, the data may be retained in the non-volatile storage of the NVDIMM such that it may be restored to the volatile memory of the NVDIMM upon restoration of power to the memory system.

Thus, a NVDIMM includes fixed amounts of non-volatile storage and volatile memory which are each resident on the NVDIMM that is located in a particular slot of the memory device. Therefore, a NVDIMM does not permit readily varying relative configuration, types, and/or amount of the non-volatile storage and volatile memory. Moreover, NVDIMMS and/or the related use thereof, such as copying data responsive to a power-off event, may not permit runtime selection of memory/storage devices in a disaggregated memory system, as detailed herein. For instance, the NVDIMMS may not permit runtime selection of a memory/storage device to perform a memory operation associated with a memory request. Further, NVDIMMS may not permit performing memory operations to store data in non-volatile storage in the absence of power-off event/interrupt and/or may require a dedicated back-up power source to provide power to the NVDIMMS in response to the power-off event and thereby permit the NVDIMMS to back-up data to non-volatile storage in response to a power-off event.

In contrast, runtime selection of disaggregated memory devices can notably be utilized in disaggregated memory devices, which unlike conventional approaches such as those which employ a NVDIMM, can instead be performed in the absence of (i.e., without) a back-up power supply to the memory system. That is, embodiments herein can permit memory operations to be performed (e.g., performed during runtime execution of an application) in the absence of a back-up power supply. Examples of memory operations (e.g., runtime memory operations) include those associated with the "checkpointing" of data upon satisfying a given threshold amount of data and/or responsive to a given condition such as completion of a subroutine within a larger routine (e.g., storing data associated with "phases" of an application among a plurality of phases of the application), data compression/decompression, among other types of memory operations.

Moreover, runtime selection of disaggregated memory/storage devices, as detailed herein, can be employed responsive to a determination that a memory/storage device in a memory system has been physically replaced. Thus, in contrast to other approaches such as those which employ a predefined amount/type of memory technology, runtime selection can permit replacement of a first type of memory/storage device with a second type of memory/storage device. Such replacement can be based, for example, on end user/host requirements and/or changes in end user/host requirements. Examples of end user/host requirements include computational requirements (e.g., an amount of permissible latency, an amount of storage/memory required, etc.), power requirements (an amount of root mean square (RMS) power, an amount of idle power, and/or a total amount of power available, etc.), cooling requirements (e.g., a location, amount, and/or type of cooling equipment), thermal requirements (e.g., a maximum permissible operating temperature, etc.), and/or physical requirements (e.g., a form factor, size, or interconnect type), among other types of requirements.

For instance, a first device which is a volatile memory device such as a DRAM can be replaced by a second device which is a non-volatile storage device such as a write-in-place memory. In some embodiments, the replacement write-in place memory can be a three-dimensional crosspoint ("3D cross-point") storage device, which is a cross-point array of non-volatile memory cells. A cross-point array of non-volatile memory cells can perform data storage based on a change of bulk resistance, in conjunction with a stackable cross-gridded data access array. Additionally, in contrast to many flash-based memories, cross-point non-volatile storage can perform a write in-place operation, where a non-volatile memory cell can be programmed without the non-volatile memory cell being previously erased.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "C," "P," "I," "S," etc., for example, particularly with respect to reference numerals in the drawings, indicate that a number of the particular feature can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of sound devices) can refer to one or more sound devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 110 can reference element "10" in FIG. 1, and a similar element can be referenced as 210 in FIG. 2. A group or plurality of similar elements or components can generally be referred to herein with a single element number. For example, a plurality of reference elements 240-1, . . . , 240-S (e.g., 240-1 to 240-S) can be referred to generally as 240. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 illustrates an example computing system 100 that includes a memory system 110 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can include a memory system 110 including a controller 115 (i.e., a memory controller) and memory device 130 and storage device 140. The computing system 100 can be coupled to a host system 120 (i.e., a host).

In some embodiments, the controller 115 can be configured to manage the memory device 130 such as a DRAM memory device and/or can manage the storage device 140. The storage device 140 and the memory device 130 can provide main memory for the computing system 100 or could be used as additional memory or storage throughout the computing system 100. In some embodiments, the memory devices 140 can be a ferroelectric field-effect transistor (FeFET) memory device. In another embodiment, the memory device 130 can be a dynamic random-access memory (DRAM), ferroelectric random-access memory (FeRAM), or a resistive random-access memory (ReRAM) device, or any combination thereof. The memory device 130 and the storage device 140 and can include one or more arrays of memory cells, e.g., volatile memory cells or non-volatile memory cells, respectively. In various embodiments, the memory device 130 can include at least one array of volatile memory cells while the storage device 140 can include at least one array of non-volatile memory cells. Embodiments are not limited to a particular type of memory device. Although shown as two distinct devices 130, 140, it will be appreciated that three or more devices, are contemplated within the scope of the disclosure.

A memory system 110 can be a hybrid of a storage device and memory module. Examples of the storage device 140 include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). In some examples, the storage device 140 can be a three-dimensional cross-point ("3D cross-point") storage device, which is a cross-point array of non-volatile memory cells. Examples of memory modules include a dual in-line memory module (DIMM) and/or a small outline DIMM (SO-DIMM).

The memory device 130 and the storage device 140 can include any combination of the different types of volatile memory devices and non-volatile memory devices. Examples of volatile memory devices can be, but are not limited to, random access memory (RAM), such as dynamic random-access memory (DRAM) and synchronous dynamic random-access memory (SDRAM). Examples of non-volatile memory devices can include, but are not limited to, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory systems 110. In some embodiments, the host system 120 is coupled to different types of memory system 110. As used herein, "coupled to" or "coupled with" generally refers to a connection between components, which can be an indirect communicative connection (e.g., with intervening components) or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory system 110, for example, to perform a command. As used herein, the term "command" refers to an instruction from a memory system to perform a task or function. For example, the controller 115 of the memory system 110 can cause a processing device 117 to perform a task based on a given command. In some embodiment, a command can include a memory request. That is, a command can be a request to the read and/or write data from and/or to the memory device (e.g., the memory device 130 and/or the storage device 140). The host system 120 may, for example, write data to the memory system 110 and read data from the memory system 110 based on a command (e.g., memory request).

The host system 120 can be coupled to the memory system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory system 110. The host system 120 can further utilize an NVM Express (NVMe) interface to access components (e.g., memory device 130, storage device 140) when the memory system 110 is coupled with the host system 120 by the PCIe interface. The physical host interface can provide an interface for passing control, address, data, and other signals between the memory system 110 and the host system 120. In general, the host system 120 can access multiple memory systems via a same communication connection, multiple separate communication connections, and/or a combination of communication connections.

The controller 115 can communicate with the devices 130, 140 to perform operations such as reading data, writing data, or erasing data at the devices 130, 140 and other such operations. The controller 115 can include hardware such as one or more integrated circuits and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or other suitable processor.

In some embodiments, the controller 115 can be resident on the memory system 110 as illustrated in FIG. 1. However, while the example memory system 110 has been illustrated in FIG. 1 as including the controller 115, in another embodiment of the present disclosure, a memory system 110 does not include a controller 115, and can instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory device 130 and/or the storage device 140. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory device 130 and/or the storage device 140. The controller 115 can further include host interface circuitry to communicate with the host system 120 via the physical host interface. The host interface circuitry can convert the commands received from the host system into command instructions to access the devices 130, 140 as well as convert responses associated with the devices 130, 140 into information for the host system 120.

The memory system 110 can also include additional circuitry or components that are not illustrated. In some embodiments, the memory system 110 can include a cache or buffer (e.g., DRAM) and address circuitry (e.g., a row decoder and a column decoder) that can receive an address from the controller 115 and decode the address to access, for instance, to the memory device 130.

As discussed herein, the controller 115 can permit runtime selection of storage devices and memory devices in a disaggregated memory system to improve functioning of the disaggregated memory system. For instance, the controller can select a storage device and/or a memory device to perform a memory operation responsive to signaling indicative of memory request corresponding to a execution of an application to improve functioning of the disaggregated memory system, in contrast to other approaches that employ fixed amounts of memory/storage and/or that do not perform runtime selection of a memory device/storage device to perform a memory operation.

For example, in some embodiments, the controller 115 can receive signaling indicative of a memory request corresponding to execution of an application. The memory request can be a command associated with a request to read data (e.g., read request) from the memory system 110 or a request to write data (e.g., write request) to the memory system 110, among other possible types of commands.

The controller 115 can in response to receiving the signaling indicative of the memory request, select a memory device, a storage device, or both, to perform a memory operation associated with the memory request. For instance, in some examples, the controller 115 can select the memory device 130. Similarly, in some examples, the controller 115 can select the storage device 140.

In some examples, the controller 115 can select at least one memory device and can select at least one storage device. For instance, the controller 115 can select both of the memory device 130 and the storage device 140. In such embodiments, the selected memory device 130 and storage device 140 can each perform at least a portion of a memory operation and/or permit substantially concurrent performance of memory operations on the memory device 130 and the storage device 140. For instance, a first memory operation on the one or more memory devices can be performed substantially concurrently (e.g. in parallel) with performing a second memory operation on the one or more of the storage devices.

As used herein, the term "substantially" intends that the characteristic need not be absolute, but is close enough so as to achieve the advantages of the characteristic. For example, "substantially concurrently" is not limited to operations that are performed absolutely concurrently and can include timings that are intended to be concurrent but due to manufacturing limitations may not be precisely concurrent. For example, due to read/write delays that may be exhibited by various interfaces and/or buses, training operations for the untrained neural networks that are performed "substantially concurrently" may not start or finish at exactly the same time. For instance, in some embodiments a first memory operation may be performed on a selected memory device during a same clock cycle with performing a second memory operation on a selected storage device.

In some embodiments, the first memory operation and the second memory operation can each be from the same application. For instance, the first memory operation can associated with one or more subroutines of an application, while the second memory operation can be associated with a different sub-routine or different plurality of subroutines of the application in which the one or more subroutines are included. In yet another instance, the first routine can be associated with one or more subroutines of an application, while the second memory operation can be associated with a routine such as routine in which the one or more subroutines are associated with the first memory operation. However, in some embodiments, the first memory operation can be associated with a first application while the second memory operation can be associated with a second application that is different from the first application.

Selection of the memory device 130, the storage device 140, or both can based on a type of the application, a priority of data associated with the memory request, an amount of data associated with the memory request, a frequency of access of data associated with the memory request, an amount of compression of data associated with the memory request, or any combination thereof.

The controller 115 can identify a type of application based on a characteristic associated with the application such as an application name, file extension of the application, size of the application, or other characteristic associated with the application. Different types of applications can have different memory/storage usage. For instance, different types of applications can have different data priorities, different amounts of data, different frequencies of accessing data, and/or employ different amounts of data compression.

Some applications may have high priority data (e.g., data which is to be accessed or stored with a higher priority than other data) while other applications may have comparatively lower priority or low priority data. In some embodiments, data with a high priority can be stored in volatile memory device, while data with a lower or low priority can be stored in a non-volatile storage device. Storing high priority data in volatile memory can improve operation of a disaggregated memory system, for instance, by providing improved (e.g., lower) latency of access of the high priority data, etc., while storing lower or low priority data in the non-volatile storage device can improve storage efficiencies such as by reducing amount of power utilized to store the low or lower priority data, etc.

Some applications may utilize large amounts of data (e.g., on total amount of data utilized over a period of time or other basis) while other application may utilize less or smaller amounts of data. In some embodiments, applications which employ memory requests which utilize a large amount of data can be stored (e.g., by virtue of selection of the non-volatile storage device) using non-volatile storage, while applications and/or memory requests which utilize a small amount of data can be stored using a volatile memory device. Storing large amounts of data using non-volatile storage can improve operation of a disaggregated memory system for instance by providing sufficient storage capacity, etc., while storing less or smaller amounts of data using the volatile memory device can reduce latency, etc.

Some application may employ applications with frequently accessed "hot" data (e.g., a total quantity of data accesses such as writes or read operation of the data over a period of time) while other application may employ "cold data" which less frequently or infrequently accessed than "hot data." In some embodiments, applications which employ "cold" data can be stored using non-volatile storage, while applications and/or memory requests which utilize "hot data" can be stored using a volatile memory device.

Storing "cold data" using non-volatile storage can improve operation of a disaggregated memory system for instance by providing sufficient storage capacity, etc., while storing "hot data" using the volatile memory device can reduce latency associated with accessing the data, etc.

Some applications may employ a degree of data compression/decompression and/or may employ large amounts of data compression/decompression while other applications may employ less data compression/decompression or may employ no data compression/decompression. In some embodiments, applications which do not employ data compression/decompression and/or employ low amounts of data compression/decompression can be stored using non-volatile storage, while applications and/or memory requests which data compression/decompression and/or which utilize large amounts of data compression/decompression be stored using a volatile memory device. Storing data which does not utilize compression/decompression and/or which uses low amounts of data compression/decompression using non-volatile storage can improve operation of a disaggregated memory system for instance by providing sufficient storage capacity, etc., while storing data which utilizes compression/decompression and/or uses large amounts of data compression/decompression using the volatile memory device can reduce latency associated with accessing the data, etc.

In various embodiments, the controller 115 can identify an application as a type of which may have low priority data, relatively small amounts of data, relatively infrequent data accesses "cold data," and/or relatively low or no data compression/decompression. In such embodiments, the controller 115 can select at least the storage device 140 and can perform a memory operation associated with the application using at least the selected storage device 140. In a non-limiting example, the controller 115 can identify that application as being or including a batch program with low priority data, relatively small amounts of data, relatively infrequent data accesses, and/or relatively low or no data compression/decompression. In such an example, the controller 115 can select at least the storage device 140 and can perform a memory operation associated with the application using at least the selected storage device 140.

Conversely, the controller 115 can identify an application as a type of which may have high priority data, relatively large amounts of data, relatively frequent data accesses "hot data," and/or which employs data compression/decompression and/or high amounts of data compression/decompression. As such, the controller 115 can select at least the memory device 130 and can perform a memory operation associated with the application using at least the selected memory device 130. Non-limiting examples of types of applications with high priority data, relatively large amounts of data, relatively frequent data accesses, and/or compression/decompression include virtualization applications such as those which are executed to run virtual machines, various training applications such as those used in to train neural networks, machine learning applications, and/or big data analytic applications, among others.

The controller 115 can in response to receiving the memory request and selecting the memory device or the storage device, or both, perform the memory operation using the selected memory device or the selected storage device, or both. For example, the controller 115 can cause a set of memory cells in the memory device 130 to activate to write data to the memory device 130 and/or the controller can cause the set of memory cells to activate to read data stored on the memory device 130. As used herein, the term "activate" refers to the act of opening a row, set, and/or page to permit a read and/or write of data to the row, set, and/or the page once opened. For example, one or more row access commands can be asserted on a row, set, and/or page of memory cells to cause data (e.g., charges) stored by the memory cells to be read by circuitry associated with the memory device 130. Similarly, the controller can perform various memory operations such as write/read operations using the storage device 140.

In various embodiments, the signaling indicative of a memory request can be sent and received during runtime execution of the application. As used herein, "runtime execution" of the application refers to the execution of instructions/code of the application by a processing device such as processing device on the host system 120. That is, the receipt of signaling of the memory request, selection of a memory/storage device, and performing a memory operation responsive to the memory request on the selected memory/storage device can all occur during runtime execution of the application. Thus, runtime selection herein can permit real-time selection of the memory storage device depending on type of the application, a priority of data associated with the memory request from the application, an amount of data associated with the memory request from the application, a frequency of access of data associated with the memory request from the application, an amount of compression of data associated with the memory request from the application, or any combination thereof, as detailed above. Accordingly, runtime selection of memory devices and storage devices in a disaggregated memory system can improve functioning of the disaggregated memory system in contrast to other approaches that employ fixed amounts of memory/storage and/or that do not perform runtime selection of a memory device/storage device to perform a memory operation.

Figure 2:
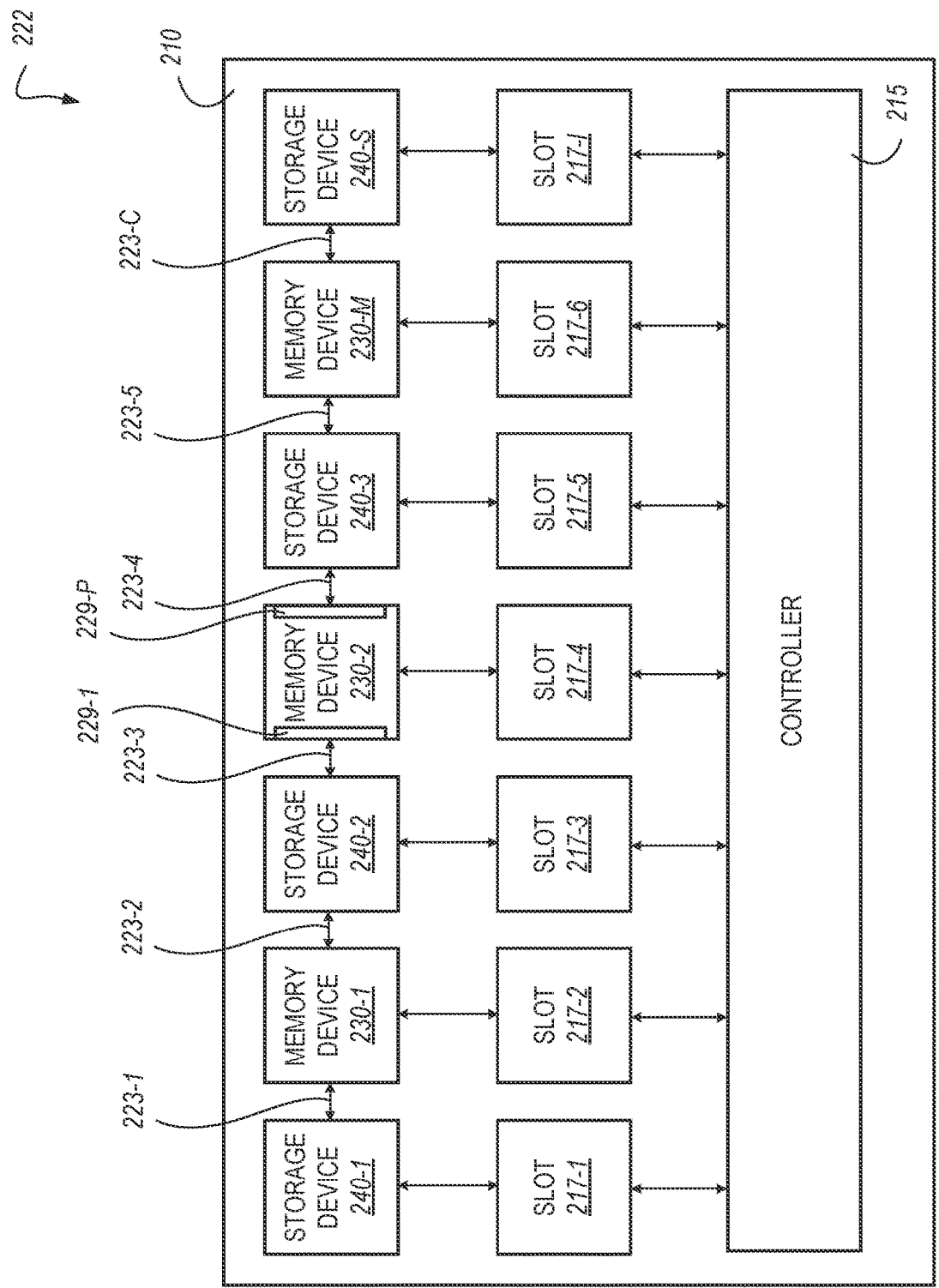
FIG. 2 illustrates an example apparatus that includes a memory system in accordance with a number of embodiments of the present disclosure.

FIG. 2 illustrates an example apparatus 222 that includes a memory system in accordance with a number of embodiments of the present disclosure. As illustrated in FIG. 2, the example apparatus 222 can including a memory system 210 including a plurality of memory devices (230-1 to 230-M) and a plurality of storage devices (240-1 to 240-S). The memory system 210, the controller 215, the memory devices 230-M, and the storage devices 240-S can be analogous to the memory system 110, controller 115, the memory device 130, and the storage device 140 illustrated in FIG. 1, herein.

As illustrated in FIG. 2, the memory system 210 can include multiple slots 217-1 to 217-I. The slots 217 can each be configured to receive one of a plurality of a first type of devices (e.g., a volatile memory device) or receive one of a plurality of a second type of devices (e.g., a non-volatile storage device). Each of the slots 217 can have the same or similar form factor and/or can include the same type of communication interface. For instance, the slots 217 can include a double data rate (DDR) memory bus or other type of communication interface to permit communication with a volatile memory device or non-volatile storage device disposed in the slot.

As illustrated in FIG. 2, the memory system 210 can include a plurality of a first type of devices (e.g., the volatile memory devices 230) disposed in first subset of the slots 217 and a plurality of second type of device (e.g., the non-volatile storage devices 240) disposed in a second sub-set of the respective slots of the slots 217. For instance, as illustrated in FIG. 2, in some embodiments a total quantity (e.g., three volatile memory devices) of the plurality of volatile memory devices 230 is less than a total quantity (e.g., four total non-volatile memory devices) of the plurality of non-volatile storage devices 240. Having the total of volatile memory devices be less than the total number of non-volatile memory devices can improve operation of the apparatus 222, for instance, by reducing a thermal output of the apparatus 222 and/or reducing an amount of power utilized by the apparatus 222. However, in some embodiments a total of a total quantity of the plurality of volatile memory devices 230 can be more than a total quantity of the plurality of non-volatile storage devices 240.

In some embodiments each of a first type of device can be coupled to at least one of a second type of device. For instance, as illustrated in FIG. 2, each of a first type of device (e.g., a memory device 230) can be coupled to at least one of a second type of device (e.g., a non-volatile storage device 240).

In some instances, each of the first type of device can be coupled to a plurality of a second type of device. For instance, as illustrated in FIG. 2, each of a first type of device (e.g., the volatile memory device 230-2) can be coupled to two (e.g. the non-volatile storage device 240-2 and the non-volatile storage device 240-3) of the second type of device. For example, a first type of device (e.g., the volatile memory device 230-2) can have a first portion 229-1 and a second portion 229-P. As illustrated in FIG. 2, the first portion 229-1 can be opposite the second portion 229-P. In various example, a first one (e.g., 240-2) of the plurality of second type of device can be coupled to the first portion 229-1 of the first type of device while a second one (e.g., 240-3) of the second type of device is coupled to the second portion 229-P of the first type of device. Having the first type of device able to be coupled to a plurality of a second type of device can permit substantially concurrent communication between the first type of device and the plurality of second type of device coupled to the first type of device.

In some embodiments, as illustrated in FIG. 2, the first memory device (e.g., 230-2) can be adjacent to the first storage device (240-2). Having the first memory device adjacent to the first storage device can provide a shortest possible path between the first memory device and the first storage device which can provide improved (e.g., faster) communication between the first memory device and the first storage device.

The plurality of first type of devices (e.g., the volatile memory devices 230) can be coupled to the plurality of second type of devices (e.g., the non-volatile storage device 240) via multiple communication channels 223-1, 223-2, 223-3, 223-4, 223-5, ... 223-C (hereinafter "communication channels 223"). As used herein, a "communication channel" generally refers to a connection provided via an interface that can permit communication between logic or other circuitry. As illustrated in FIG. 2, a communication channel can be provided between each device (e.g., between memory device 230-1 and storage device 240-2) in each slot of the slots 217-1 to 217-I. Similarly, a communication channel (not illustrated) can be provided by each slot of the plurality of slot 217 to permit communication between the controller 215 and each of the storage devices 240 and each of the memory devices 230.

In various embodiments, each of the first type of device and the second type of device can operate in accordance with the same data transfer protocol. Similarly, in some examples, each of the first type of device and the second type of device can have the same or substantially similar form factor (e.g., shape, size, and/or communication pin layout/interface configuration). Having the first type of device and second type of device operate in accordance with the same data transfer protocol and/or having the same or substantially similar form factor can promote aspects of runtime selection of storage/memory devices. For instance, in various embodiments, the first type of device can be a first dual-in-line memory module (DIMM) and the second type of device further comprises a second DIMM that operates in accordance with the same data transfer protocol by which the first DIMM operates in accordance with. In such examples, the controller 215 can coupled concurrently to the first DIMM and the second DIMM and can provide substantially concurrent communication with the first DIMM and the second DIMM, among other possibilities. In some embodiments, the first DIMM can include or form at least a portion of DRAM and the second DIMM can include or form at least a portion of including at least one cross-point array of memory cells or phase change memory device which operates in accordance with the same data transfer protocol and has the same or substantially similar form factor as the DRAM. For instance, the first DIMM can include or form at least a portion of DRAM and the second DIMM can include or form at least a portion of at least one cross-point array of memory cells which operates in accordance with the same data transfer protocol and has the same or substantially similar form factor as the DRAM.

In various embodiments, the controller can be communicatively coupled to the memory system 210 to perform aspects of runtime selection of memory device and/or a storage device in a disaggregated memory system, as detailed herein. For instance, the controller 215 can receive a first memory request from an application during runtime execution of the application.

In response to receipt of the memory request and during runtime execution of the application, the controller 215 can select a storage device or a memory device, or both, to perform a memory operation responsive to the memory request. As mentioned, the controller 215 can perform the memory operation using the selected memory device or the storage device, or both during runtime execution of the application.

Figure 3:
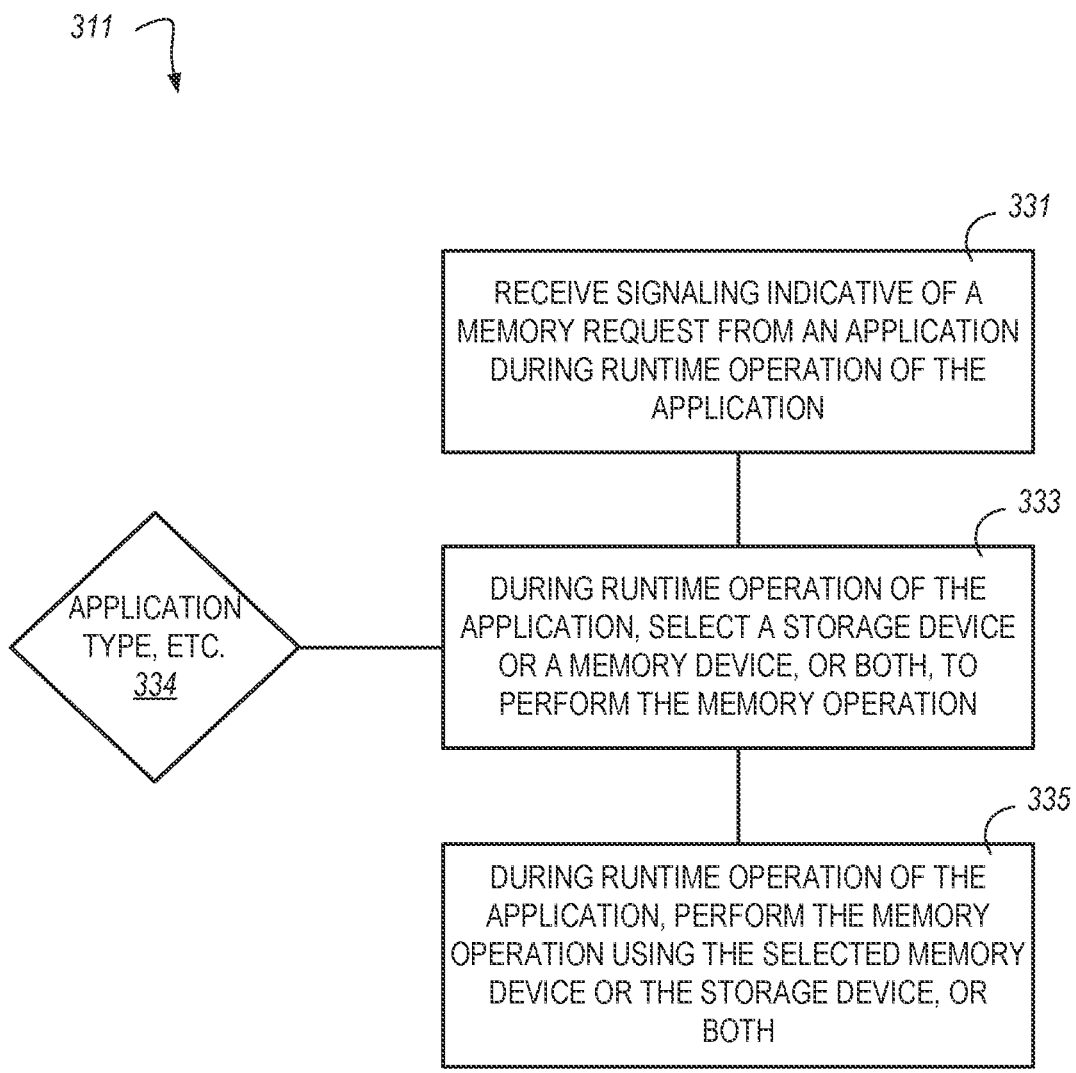
FIG. 3 illustrates a flow diagram corresponding to runtime selection of memory devices and storage devices in a disaggregated memory system in accordance with a number of embodiments of the present disclosure.

FIG. 3 illustrates a flow diagram 311 corresponding to runtime selection of memory devices and storage devices in a disaggregated memory system in accordance with a number of embodiments of the present disclosure.

At 331, the flow diagram 311 includes receipt of a memory request from an application during runtime execution of the application. As mentioned, the memory request can be a read request, a write request, or another type of request received by a controller which is communicatively coupled to a memory system including a storage device and a memory device.

At 333, the flow diagram 311 can in response to receipt of the signaling indicative of the memory request and during runtime execution of the application, select the storage device or the memory device, or both, to perform a memory operation responsive to the signaling indicative of the memory request (i.e., responsive to the memory request). As illustrated at 334, in some embodiments, selection of the storage device or the memory device or both can be based on at least on a type of the application from which the memory request was sent. However, in some embodiments, selection of the storage device or the memory device, or both can be based on, alternatively or in addition to the type of application, various other factors such as a priority of data associated with the memory request from the application, an amount of data associated with the memory request from the application, a frequency of access of data associated with the memory request from the application, an amount of compression of data associated with the memory request from the application; or any combination thereof.

At 335, the flow diagram 311 can include performance of a memory operation using the selected memory device or the storage device, or both. For instance, the flow diagram can include using the selected memory device or the storage device, or both during runtime execution of the application and responsive to selection of storage device or the memory device, or both. As mentioned, performance of the memory operation can include performing a read operation and/or performing a write operation of data in the memory device, the storage device, or both, among other possible types of memory operations which can be performed using the memory device, the storage device, or both.

Figure 4:
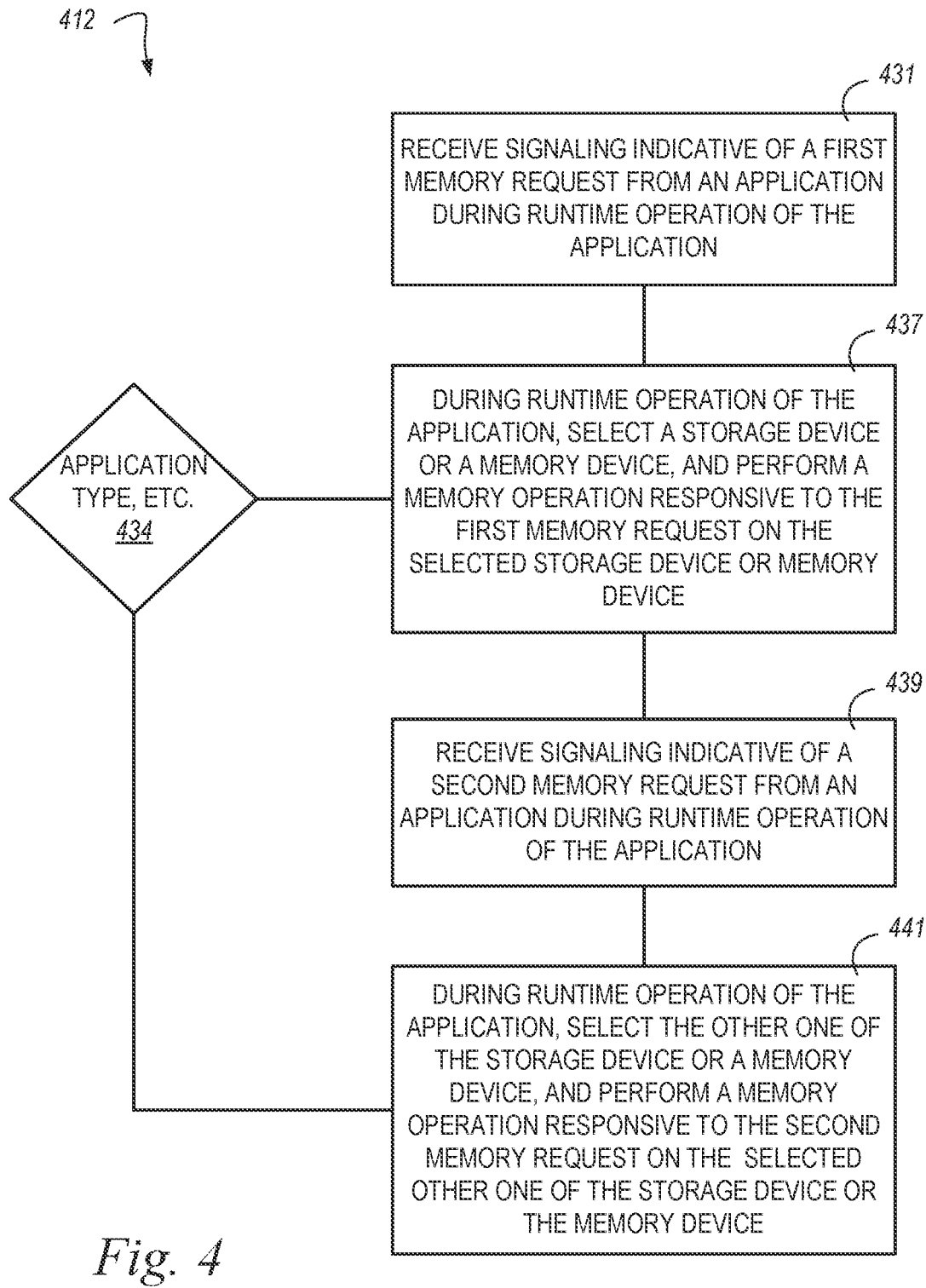
FIG. 4 illustrates another flow diagram corresponding to runtime selection of memory devices and storage devices in a disaggregated memory system in accordance with a number of embodiments of the present disclosure.

FIG. 4 illustrates another flow diagram 412 corresponding to runtime selection of memory devices and storage devices in a disaggregated memory system in accordance with a number of embodiments of the present disclosure.

At 431, the flow diagram 412 can include receiving signaling indicative of a first memory request from an application during runtime operation of the application. At 437 the flow diagram can include selection of a storage device or a memory device during runtime operation of the application and can include performing a memory operation responsive to the first memory request on the selected storage device or memory device. As illustrated at 434, selection of the storage device or a memory device can be based on an application type, a type of the application, a priority of data associated with the memory request from the application, an amount of data associated with the memory request from the application, a frequency of access of data associated with the memory request from the application, an amount of compression of data associated with the memory request from the application, or any combination thereof.

At 439, the flow diagram 412 can include receiving signaling indicative of a second memory request from an application during runtime operation of the application. The application from which the second memory request is received can be the same application or a different application than from which the first memory request is received. For instance, in some examples the same application can send the first memory request and the second memory request. In some embodiments, runtime selection of memory devices and storage devices in a disaggregated memory system, as detailed herein, can be applied to some or all memory requests received from an application during runtime execution of the application. For instance, in some embodiments, runtime selection of memory devices and storage devices in a disaggregated memory system can be applied to each memory request received from an application during runtime execution of the application.

At 441, the flow diagram 412 can include selection of the other one of the storage device or a memory device during runtime operation of the application (e.g., the application from which the second memory request was sent) and performing a memory operation responsive to the second memory request on the select other one of the storage device or the memory device. For instance, at 437 the memory device can be selected for performing the first memory request and at 441 the storage device can be selected for performing the second memory request. Conversely, at 437 the storage device can be selected for performing the first memory request and at 441 the memory device can be selected for performing the second memory request. Such selection of a storage device or a memory device to perform a first request and selection of the other one of the storage device of the memory device to perform a second memory request can permit performing the first memory operation and the second memory operation substantially concurrently (e.g. in parallel) and thereby improve performance (e.g., reduce latency) of a memory subsystem.

While described above an individual memory device and an individual storage device it is understood that the memory device can be included in a plurality of memory devices and/or the storage device can be included in a plurality of storage device. In such examples, one or more of the plurality of storage devices and/or one or more of the plurality of memory devices can be selected to perform a first memory request and a different one or more the plurality of storage devices and/or a different one or more of the memory devices can be selected to perform a second memory request.

Figure 5:
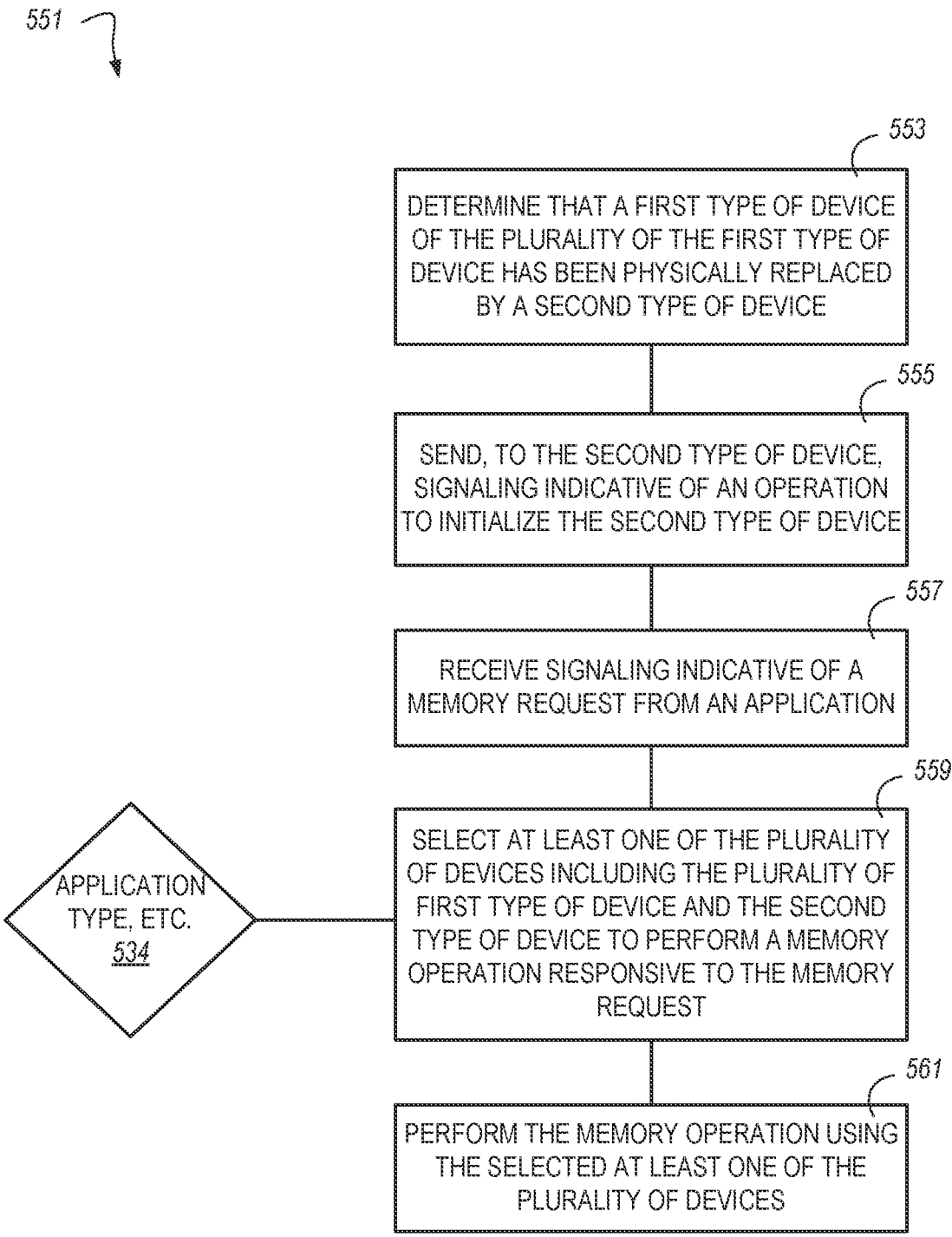
FIG. 5 illustrates yet another flow diagram corresponding to runtime selection of memory devices and storage devices in a disaggregated memory system in accordance with a number of embodiments of the present disclosure.

FIG. 5 illustrates yet another flow diagram 551 corresponding to runtime selection of memory devices and storage devices in a disaggregated memory system in accordance with a number of embodiments of the present disclosure. At 553, the flow diagram 551 can include determination that a first type of memory device of a plurality of first type of memory devices has been physically replaced by a second type of memory device. As used herein, being physically replaced refers to the physical removal of first type of storage device or memory module with a second type of storage device or memory module. For instance, a first type of storage device or memory module can be disposed in a slot, the first type of storage device or memory module can be physically removed from the slot, and a second type of storage device or memory module can be physically inserted into or otherwise coupled to the slot in which the first type of storage device or memory was formerly disposed in. As mentioned, such replacement of devices can enhance functioning of a memory system by permitting the memory system to be customized, for instance, based on end user/host requirements and/or changes in end user/host requirements.

That is, the second type of memory device can be a different type of memory device which has different characteristics (e.g., latency, size, power consumption, thermal output, data retention capabilities in a power-off event, etc.) than the first type of memory device. For instance, the first type of memory device can be a volatile memory device, or a non-volatile memory device and the second type of memory device can be the other of the volatile memory device or the non-volatile memory device. For example, the first type of memory device can be a volatile memory device such as a DRAM while the second type of memory device can be a non-volatile memory device as a non-volatile three-dimensional array of memory cells.

At 555, the flow diagram 551 can include sending to the second type of memory device signaling indicative of an operation to initialize the second type of memory device. In some embodiments, an initialization sequence can be initiated automatically or otherwise in response to physical replacement of the first type of memory device with the second type of device. As mentioned, physical replacement of the first type of memory device with the second type of memory device can include coupling the second type of memory device to a slot in the memory system which the first type of memory device was formerly disposed in.

At 557 the flow diagram 551 can include receiving signaling indicative of a memory request. At 559 the flow diagram 551 can include selection of at least one of the plurality of devices including the first type of device and the second type of device to perform a memory operation responsive to the memory request. At 534 selection of the at least one of the plurality of devices can be based on a type of application, among other possible items such an amount of data associated with the memory request, etc. as described herein. At 561 the flow diagram 551 can include performing a memory operation using the selected at least one of the plurality of devices including the first type of device and the second type of device.

Figure 6:
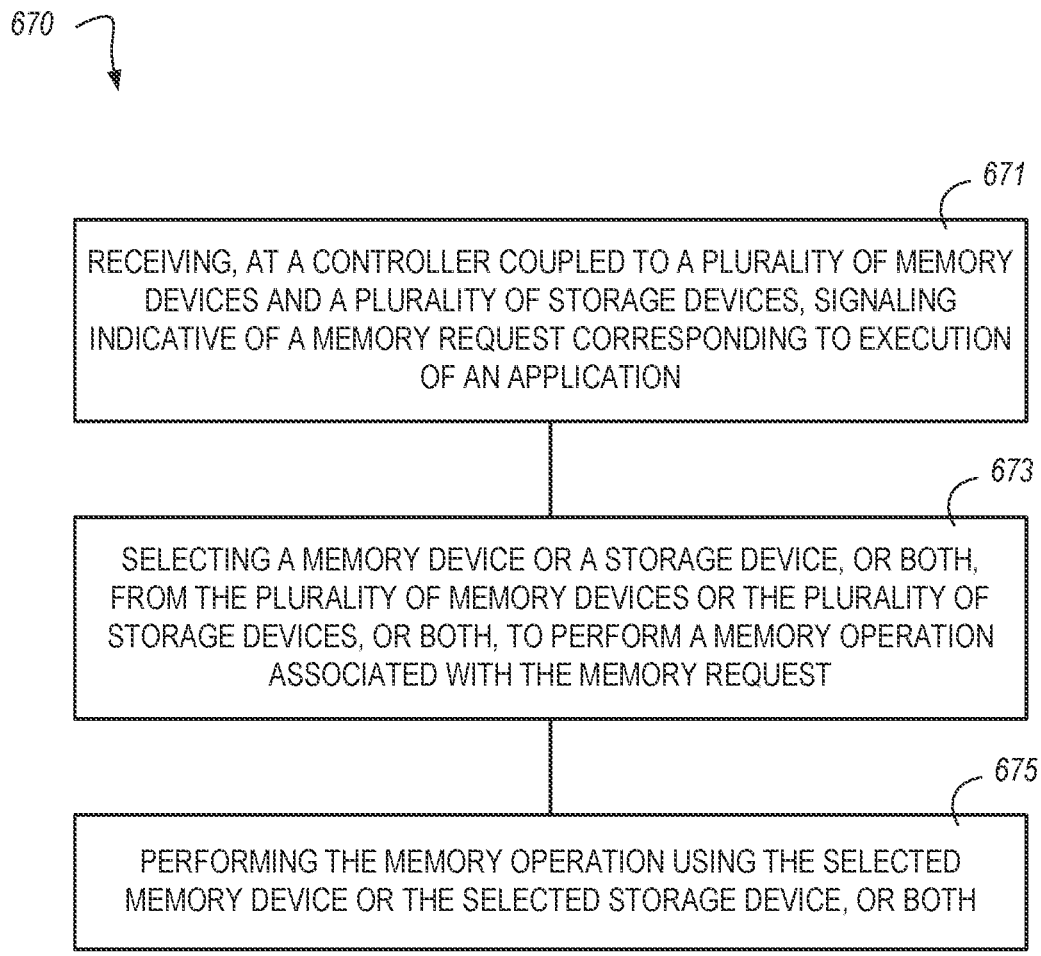
FIG. 6 illustrates a diagram representing an example method for runtime selection of memory devices and storage devices in a disaggregated memory system in accordance with a number of embodiments of the present disclosure.

FIG. 6 illustrates a diagram representing an example method 670 for runtime selection of memory devices and storage devices in a disaggregated memory system in accordance with a number of embodiments of the present disclosure. As described in connection with FIG. 6, a computer system (e.g., computing system 100 can include a controller (e.g., the controller 115 of FIG. 1) and a processing device (e.g., the processing device 117 of FIG. 1). The controller can cause the processing device to perform aspects of runtime selection of memory devices and storage devices in a disaggregated memory system.

At 671, the method 670 describes the controller be coupled to a plurality of memory devices and a plurality of storage devices and can receive signaling indicative of a memory request corresponding to execution of an application. For instance, the controller can receive the signaling indicative of a memory request corresponding to runtime execution of the application.

At 673, the method 670 describes the controller can select from the plurality of memory devices or the plurality of storage devices, or both, to perform a memory operation associated with the memory request. For instance, the controller can select from the plurality of memory devices or the plurality of storage devices, or both, responsive to receiving signaling indicative of the memory request during runtime execution of the application (e.g., the application from which the memory request was sent and/or the application from which the memory request is associated with). As mentioned, selection during runtime execution of the application can permit performing various memory operations such as "checkpointing" etc., as detailed herein, in the absence of a back-up power supply and/or can enhance performance of a memory system such as memory system such as memory system 110 as illustrated in FIG. 1.

In some embodiments, the controller can select the memory device or the storage device, or both, based on a frequency of accesses of data associated with the memory request. For example, the controller select a memory device or the storage device, or both, based on comparison of a frequency of access of data (e.g., data stored in the memory device and/or data stored in the storage device) associated with the memory request from the application to an access threshold. For instance, the controller can select at least the memory device when data associated with the memory request from the application is accessed at a frequency that is greater than an access threshold. In some embodiments, the controller can select the memory device in the absence of selection of a storage device when data associated with the memory request from the application is accessed at a frequency that is greater than an access threshold. Stated differently, in some embodiments, the controller can select the memory device and not select a storage device when data associated with the memory request from the application is access at a frequency that is greater than an access threshold. Selection of the memory device in the absence of selection of the storage device when data associated with the memory request from the application is accessed at a frequency that is greater than an access threshold can reduce latency associated with memory requests for the data and/or otherwise enhance operation of the memory system, such as the memory system 110 as illustrated in FIG. 1.

Conversely, in some embodiments the controller can select at least the storage device when data associated with the memory request from the application is accessed at a frequency that is less than the access threshold. For instance, the controller can select the storage device in the absence of selection of a memory device when data associated with the memory request from the application is accessed at a frequency that is less than the access threshold. Selecting the storage device in the absence of the memory device when data associated with the memory request from the application is accessed at a frequency that is less than the access threshold can reduce power consumption of a memory system, such as the memory system 110 as illustrated in FIG. 1, and/or otherwise enhance operation of the memory system.

At 675, the method 670 describes the controller can perform a memory operation using the selected memory device or the selected storage device, or both. For instance, responsive to receiving the signaling indicative of the memory request and selecting the memory device or the storage device, or both, the controller can perform a memory operation using the selected memory device or the selected storage device, or both.

Performing the method 670 during runtime execution of an application can enhance performance of memory system and/or permit performance of the memory operations in the absence of a back-up power supply, as detailed herein. For instance, in some embodiments the method 670 can include performing during runtime execution of an application a memory operation such as "checkpointing." Checkpointing can be performed by determining a first data state of data associated with the application using the memory device and writing a copy of data corresponding to the first data state to the storage device. The first data state (i.e., a first checkpoint) can correspond to completion of a phase (e.g., a first phase) in an application, completion of a subroutine (e.g., a first subroutine) within a larger routine in an application, or an occurrence of another event associated with the application. In such examples, the method 670 can include determining that the first data state of the data associated with the application has been updated to a second data state (i.e., a second checkpoint) of data associated with the application using the memory device and can include writing a copy of data corresponding to a second data state to the storage device. The second data state can correspond to completion of a subsequent phase (subsequent to completion of at least a first phase) and/or completion of all phases of an application, completion of a subsequent subroutine (subsequent to completion of at least the first subroutine) and/or completion of a larger routine in which a subroutine corresponding to the first data state is included, and/or occurrence of another event associated with the application.

For instance, the data in the first data state, the second data state, or another data state can be data stored in the volatile memory device which can periodically or in response to an event (e.g., completion of a subroutine and/or phase of an application) be copied and stored in the non-volatile storage device. Such "checkpointing" of data can thereby utilize various properties of the volatile memory device (e.g., relatively lower latency), and yet can utilize the non-transitory storage device to ensure that data associated with the respective "checkpoints" is retained in the non-volatile storage device to permit recovery of the checkpointed data. Such "checkpointing" can notably occur during runtime of the application and therefore can be performed in the absence of a dedicate back-up power supply to the memory system.

In some examples, the method 670 can include deleting the copy of the data corresponding to the first data state in response to determining that the first data state has been updated to the second data state. However, in some examples the copy of data corresponding to the first data state can be retained and/or copied to another location such as another location within or external to the memory system in which the controller is included.

In some embodiments, the method describes the controller can determine, based at least in part on the received signaling, a type of the memory operation to be performed for each portion of a plurality of portions of a memory operation. For instance, a plurality of portions of a memory operation can correspond to a plurality of data states (e.g., a plurality of data states) and/or a plurality of different types of memory operations (e.g., a copy operation, a write operation, a read operation, etc.).

In some embodiments, the method can describe the controller to allocate performance of a first portion of plurality of portions of the memory operation to a non-volatile storage device based on a determination type of the memory operation to be performed and the controller to allocate performance of a second portion of the plurality of portions of the memory operation to a volatile memory device of the plurality of volatile memory devices based on a determination that the type of operation to be performed is a second type of operation. In such embodiments, the method can describe the controller is to cause performance of the first portion of the memory operation or the second portion of the memory operation, or both.

Although specific embodiments have been illustrated and as described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
responsive to receiving signaling indicative of a memory request from an application, selecting from a hybrid memory system including at least one volatile memory device and at least one non-volatile memory device, a volatile memory device included in the hybrid memory system or a non-volatile storage device included in the hybrid memory system, or both, to perform a memory operation associated with the memory request; and
performing the memory operation using the selected volatile memory device or the selected non-volatile storage device, or both.

2. The method of claim 1, further comprising selecting the volatile memory device or the non-volatile storage device, or both, based on a type of the application, a priority of data associated with the memory request, an amount of data associated with the memory request, a frequency of access of data associated with the memory request, or any combination thereof.

3. The method of claim 1, further comprising selecting the volatile memory device or the non-volatile storage device, or both, based on an amount of compression of data associated with a memory request, an amount of decompression of the data associated with the memory request, or a combination thereof.

4. The method of claim 1, wherein selecting the volatile memory device or the non-volatile storage device, or both occurs during runtime execution of the application, wherein performing the memory operation occurs during runtime execution of the application, or both.

5. The method of claim 1, further comprises:
selecting at least the volatile memory device when a frequency of accesses of data associated with the memory request is greater than an access threshold; and
selecting at least the non-volatile storage device when a frequency of accesses of data associated with the memory request less than the access threshold.

6. The method of claim 1, wherein the selecting the memory device or the storage device, or both further comprises selecting:
at least one volatile memory device; and
at least one non-volatile storage device.

7. The method of claim 6, wherein performing the memory operation further comprises performing a first memory operation on a selected volatile memory device during a same clock cycle with performing a second memory operation on a selected non-volatile storage device.

8. The method of claim 1, further comprising:
determining a first data state of data associated with the application using a selected volatile memory device;
writing a copy of data corresponding to the first data state to a selected non-volatile storage device;
determining that the first data state of the data associated with the application has been updated to a second data state;
deleting the copy of the data corresponding to the first data state; and
writing a copy of data corresponding to the second data state to the selected non-volatile storage device.

9. An apparatus, comprising:
a memory system including a non-volatile storage device and a volatile memory device; and
a controller coupled to the memory system, wherein the controller is configured to:
responsive to receipt of a memory request from an application, select the non-volatile storage device, the volatile memory device, or both, to perform a memory operation associated with the memory request; and
perform the memory operation using the selected volatile memory device, the non-volatile storage device, or both.

10. The apparatus of claim 9, further comprising selection of the non-volatile storage device, the volatile memory device, or both, based on a type of the application, a priority of data associated with the memory request, an amount of data associated with the memory request, a frequency of access of data associated with the memory request, an amount of compression of data associated with a memory request, an amount of decompression of the data associated with the memory request, or any combination thereof.

11. The apparatus of claim 9, wherein:
the volatile memory device includes a first dual in-line memory module (DIMM) and a second DIMM, wherein the first DIMM is located opposite from the second DIMM of the volatile memory device;
a first non-volatile storage device is coupled to the first DIMM of the volatile memory device, and
a second non-volatile storage device is coupled to the second DIMM of the volatile memory device.

12. The apparatus of claim 9, wherein the volatile memory device is included in a plurality of volatile memory devices, and wherein the non-volatile storage device is included in a plurality of non-volatile storage devices.

13. The apparatus of claim 12, wherein a total quantity of the plurality of volatile memory devices is less than a total quantity of the non-volatile storage devices.

14. The apparatus of claim 12, wherein a total of a total quantity of the plurality of volatile memory devices is more than a total quantity of the plurality of non-volatile storage devices.

15. The apparatus of claim 12, wherein each volatile memory device of the plurality of volatile memory devices is coupled to two non-volatile storage devices of the plurality of non-volatile storage devices.

16. A system, comprising:
a memory system including:
a plurality of slots;
a plurality of a first type of device disposed in respective slots of the plurality of slots; and
a controller coupled to the memory system, wherein the controller is configured to:
determine that a first type of device of the plurality of the first type of device has been physically replaced by a second type of device, wherein the first type of device further comprises volatile memory device, and wherein the second type of device further comprise a non-volatile memory device;
responsive to the determination that the first type of device has been physically replaced by the second type of device, send, to the second type of device, signaling indicative of an operation to initialize the second type of device;
receive signaling indicative of a memory request from an application;
select, in response to receipt of the signaling indicative of the memory request, at least one of a plurality of devices including the plurality of first type of device and the second type of device to perform a memory operation responsive to the memory request; and
perform the memory operation using the selected at least one of the plurality of devices.

17. The system of claim 16, wherein the volatile memory device further comprises a random access memory (RAM), a dynamic random-access memory (DRAM), a synchronous dynamic random-access memory (SDRAM), or any combination thereof.

18. The system of claim 16, wherein the non-volatile memory device further comprises a NAND flash memory, NOR flash memory, a cross-point array of memory cells, a phase change memory device, or any combination thereof.

19. The system of claim 16, wherein the controller is configured to select the at least one of a plurality of devices including the plurality of first type of device and the second type of device to perform the memory operation based on a type of the application, a priority of data associated with the memory request, an amount of data associated with the memory request, a frequency of access of data associated with the memory request, an amount of compression of data associated with a memory request, an amount of decompression of the data associated with the memory request, or any combination thereof.

* * * * *